United States Patent Office 2,881,191
Patented Apr. 7, 1959

2,881,191

17β-HYDROXY-17α-METHYLANDROSTANE-3, 11-DIONE

Milton E. Herr, Kalamazoo, Mich., assignor to The Upjohn Company, Kalamazoo, Mich., a corporation of Michigan No Drawing. Application December 5, 1955
Serial No. 550,843

1 Claim. (Cl. 260—397.45)

This invention pertains to organic compounds of the androstane series and is more particularly concerned with novel 17β-hydroxy-17α-methylandrostane-3,11-diones of the formula

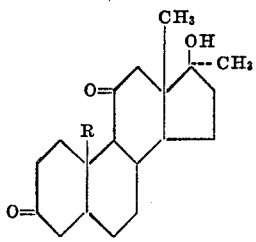

wherein R is selected from hydrogen and methyl. It is to be understood that the configuration of the 5-hydrogen atom can be α or β and that both forms are included within the scope of the present invention. The designation "5α-androstane" is intended to represent "androstane," and the designation "5β-androstane" is intended also to represent "etiocholane."

It is an object of this invention to provide the 17β-hydroxy-17α-methylandrostane-3,11-diones of the above formula. Said compounds are potent anabolic and androgenic agents having a favorable ratio of anabolic to androgenic activity for anabolic agent purposes and can be used in place of prior anabolic and androgenic agents in known anabolic and androgenic pharmaceutical preparations. The compounds also are anti-pituitary agents and can be employed in place of known anti-pituitary agents in pharmaceutical formulations used for this purpose. Other objects and uses will be apparent to one skilled in the art.

The 17β-hydroxy-17α-methylandrostane-3,11-diones of the above formula are also useful in the form of their 17-monoacylate. Their acylate, e.g., acetate, propionate, trimethylacetate, α or β-cyclopentylpropionate, α or β-cyclohexylpropionate, benzoate, phenylacetate, cyclohexylacetate, α or β-phenylpropionate, or other hydrocarbon carboxylate, preferably containing from one to nine carbon atoms, inclusive, are useful for the same purposes as the parent compounds, and in addition these esters are useful for the purification of the parent 17β-hydroxy-17α-methylandrostane-3,11-diones.

The 17β-hydroxy-17α-methylandrostane-3,11-diones of the present invention can be prepared readily from the corresponding 11β,17β-dihydroxy-17α-methylandrostane-3-ones (starting compounds are described in copending application Serial No. 550,845, filed December 5, 1955, now U.S. Patent 2,842,570) by oxidation of the 11β-hydroxy group to an 11-keto group. The oxidation can be carried out using the preferred chromic acid, potassium permanganate, potassium dichromate, N-bromoacetamide, N-chlorosuccinimide, tertiary-butyl hypochlorite, or other oxidizing agent, preferably using a solvent, e.g., acetic acid or chloroform with chromic acid, tertiary-butyl alcohol with N-bromoacetamide, N-chlorosuccinimide, or tertiary-butyl hypochlorite, or other suitable solvent. The 17β - hydroxy - 17α - alkylandrostane-3,11-diones and 17β-hydroxy-17α-alkyl-19-norandrostane-3,11-diones wherein the alkyl radical is preferably a lower-alkyl radical containing from two to eight carbon atoms, inclusive, e.g., ethyl (particularly preferred), propyl, isopropyl, butyl, secondary-butyl, amyl, hexyl, heptyl, octyl, etc., are prepared by the same methods and have similar androgenic, anabolic, and anti-pituitary activity.

The following examples are illustrative of certain preferred products and processes and are not to be construed as limiting the invention.

EXAMPLE 1

A solution of one gram of 11β,17β-dihydroxy-17α-methyl-5α-androstane-3-one in thirty milliliters of glacial acetic acid is mixed with 0.8 gram of chromic anhydride ($CrO_3$) dissolved in a mixture of three milliliters of water and thirty milliliters of acetic acid. After the reaction mixture has stood for five hours at room temperature, ten milliliters of methyl alcohol is added, the mixture then concentrated in vacuo to small volume, and fifty milliliters of water added. The solid which precipitates is recovered by filtration, washed with water and dried in vacuo providing 0.687 gram of 17β-hydroxy-17α-methyl-5α-androstane-3,11-dione melting at 190 to 215 degrees centigrade with decomposition. Recrystallization from dilute aqueous acetone provides 0.427 gram of purified product melting at 210 degrees centigrade with decomposition having $[\alpha]_D^{24}$ equals plus 56 degrees in chloroform.

*Analysis.*—Calcd. for $C_{20}H_{30}O_3$: C, 75.44; H, 9.50. Found: C, 74.93; H, 9.28.

EXAMPLE 2

11β,17β-dihydroxy-17α-methyl-5β-androstane-3-one is converted by chromic acid oxidation to 17β-hydroxy-17α-methyl-5β-androstane-3,11-dione, melting at 149–151 degrees centigrade, following the procedure of Example 1.

EXAMPLE 3

Following the chromic acid oxidation procedure of Example 1, 11β,17β-dihydroxy-17α-methyl-19-nor-5α-androstane-3-one is converted to 17β-hydroxy-17α-methyl-19-nor-5α-androstane-3,11-dione and 11β,17β-dihydroxy-17α-methyl-19-nor-5β-androstane-3-one is converted to 17β-hydroxy-17α-methyl-19-nor-5β-androstane-3,11-dione. Other 17β - hydroxy - 17α-alkyl-5α(and 5β)-androstane-3,11-diones and 17β-hydroxy-17α-alkyl-19-nor-5α(and 5β)-androstane-3,11-diones, wherein the alkyl radical is as defined and illustrated above, are prepared by the same procedure from corresponding 11β,17β-dihydroxy-17α-alkyl-5α(and 5β)-androstane-3-ones and 11β,17β-dihydroxy-17α-alkyl-19-nor-5α(and 5β)-androstane-3-ones.

EXAMPLE 4

A solution of 17β-hydroxy-17α-methyl-5α-androstane-3,11-dione in dry pyridine is heated under reflux with a one- to three-molar excess of acetic anhydride for about six hours. The mixture is then cooled, slowly diluted with water while stirring, and the solid precipitate obtained removed by filtration. The solid is washed with two percent aqueous hydrochloric acid solution and with water and then dried in vacuo. Recrystallization or chromatographic separation provides purified 17β-hydroxy-17α-methyl-5α-androstane-3,11-diones 17-acetate. In exactly the same manner 17β-hydroxy-17α-methyl-5β-androstane - 3,11 - dione 17 - acetate, 17β - hydroxy-17α-methyl - 19 - nor-5α-androstane-3,11-dione 17-acetate, and 17β-hydroxy-17α-methyl-19-nor-5β-androstane-3,11-dione 17-acetate are prepared from 17β-hydroxy-17α-methyl-5β - androstane - 3,11-dione, 17β-hydroxy-17α-methyl-19-nor - 5α - androstane-3,11-dione, and 17β-hydroxy-17α-methyl-19-nor-5β-androstane-3,11-dione, respectively, and acetic anhydride. Substituting the appropriate acylating agent, i.e., the appropriate acid, acid anhydride or acid chloride, for the acetic anhydride in the foregoing procedure provides other 17-acylates or 17β-hydroxy-17α-methyl-5α(and 5β)-androstane-3,11-dione and 17β-hydroxy-17α-methyl-19-nor-5α(and 5β)-androstane-3,11-dione including the 17-formate, propionate, trimethylacetate, furoate, α or β-cyclohexylpropionate, benzoate, phenylacetate, α or β-cyclopentylpropionate, α or β-phenylpropionate, methylbenzoate, α or β-furylacrylate, valerate, methacrylate, and the like. The foregoing 17-acylates can also be prepared by oxidation, according to the procedures of Examples 1 to 3, of corresponding 17-acylates of 11β,17β-dihydroxy-17α-methyl-5α(and 5β)-androstane-3-one, and 11β,17β-dihydroxy-17α-methyl-19-nor-5α(and 5β)-androstane-3-one. The 17-acylates of other 17β-hydroxy-17α-alkyl-5α(and 5β)-androstane-3,11-diones and 17β-hydroxy-17α-alkyl-19-nor-5α(and 5β)-androstane-3,11-diones, wherein the alkyl and acylate radicals are as defined and illustrated above, also are prepared by the foregoing procedures.

I claim:
1. 17β-hydroxy-17α-methylandrostane-3,11-dione of the following formula:

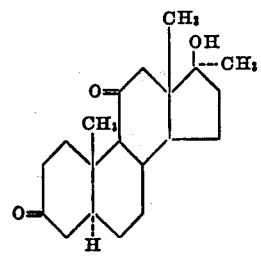

References Cited in the file of this patent
UNITED STATES PATENTS
2,697,110    Murray et al. _____ Dec. 14, 1954